United States Patent
Pujol Artigas

(10) Patent No.: US 8,680,705 B2
(45) Date of Patent: Mar. 25, 2014

(54) VERTICAL AXIS WIND TURBINE

(75) Inventor: José María Pujol Artigas, Barcelona (ES)

(73) Assignee: Industrias Tecnoflex, S.A. (ES)

( * ) Notice: Subject to any disclaimer, the term of this patent is extended or adjusted under 35 U.S.C. 154(b) by 48 days.

(21) Appl. No.: 13/553,844

(22) Filed: Jul. 20, 2012

(65) Prior Publication Data

US 2013/0168967 A1   Jul. 4, 2013

(30) Foreign Application Priority Data

Jul. 22, 2011   (ES) ................................. 201100698 U

(51) Int. Cl.
   *F03D 9/00*   (2006.01)
(52) U.S. Cl.
   USPC .......................................................... 290/55
(58) Field of Classification Search
   USPC ............. 290/44, 55; 415/4.2, 4.4; 416/132 B, 416/227 A
   See application file for complete search history.

(56) References Cited

U.S. PATENT DOCUMENTS

| | | | | | |
|---|---|---|---|---|---|
| 3,918,839 | A | * | 11/1975 | Blackwell et al. | ............. 416/175 |
| 5,133,637 | A | * | 7/1992 | Wadsworth | .................... 415/4.4 |
| 5,855,470 | A | * | 1/1999 | Holmes | ............................ 416/11 |
| 6,979,170 | B2 | * | 12/2005 | Dery et al. | ...................... 415/4.2 |
| 7,880,322 | B2 | * | 2/2011 | Cumings et al. | ................ 290/54 |
| 7,896,609 | B2 | * | 3/2011 | Mitchell et al. | ................ 415/4.2 |

FOREIGN PATENT DOCUMENTS

WO       2011/078451       6/2011

* cited by examiner

*Primary Examiner* — Vanessa Girardi
(74) *Attorney, Agent, or Firm* — Hess Patent Law Firm LLC; Robert J. Hess

(57) ABSTRACT

Improved vertical axis wind turbine includes a rotor (1) arranged to rotate relative to a vertical axis integrated by a central body bearing a plurality of blades (3) connected to the central body through radial arms (2). The rotor (1) is operatively connected to move an electric generator (11). The central body of the rotor (1) is attached on its bottom end, in an operating situation, to a plate (4) that is releasably fastened to a crown (5) with inner gearing of a step-up assembly (10) of planetary gears, with an output torque transmission member that is coupled to a shaft or rotating member of the electric generator (11).

6 Claims, 3 Drawing Sheets

VERTICAL AXIS WIND TURBINE

FIELD OF THE ART

The present invention relates to an improved vertical axis wind turbine of the type comprising a rotor arranged to rotate relative to a vertical axis bearing a plurality of blades through radial arms, said rotor being operatively connected to move an electric generator that converts the rotational force generated by the wind into electric energy.

STATE OF THE PRIOR ART

In an attempt to use clean, renewable sources of energy, wind turbines are being increasingly used to transform wind energy into electric energy. A wind turbine generally comprises a rotor with a plurality of vanes or blades connected to a central body, wherein said rotor is arranged to rotate relative to an axis by virtue of the wind and operatively connected to move an electric generator.

Wind turbines can be classified into two main groups according to the orientation of the rotating shaft of the rotor relative to the wind direction. A first type, generally known as horizontal axis wind turbines, are characterised by having the rotating shaft of the rotor arranged parallel to the direction of the wind and, as a result, they need an orientation device in order to align the rotor according to the direction of the wind. A second type concerns the wind turbines generally known as vertical axis wind turbines, which have their rotating shaft arranged perpendicular to the direction of the wind and are independent from the direction of the wind.

WO2011/078451 describes a traditional generator of said second type, and the present applicant is the assignee of the Spanish Utility Model 201001230, which also shows a vertical axis wind turbine.

The present utility model presents a particular building structure of the wind turbine destined to optimise the transfer of wind energy into electric energy through the incorporation of a step-up assembly of planetary gears embedded between the wind turbine and an electric generator.

BRIEF DISCLOSURE OF THE INVENTION

The vertical axis wind turbine of the present invention comprises a well-know general structure as such, which includes a rotor arranged to rotate relative to a vertical axis integrated by a central body bearing a plurality of blades concentrically and equidistantly connected to said central body through radial arms, said rotor being operatively connected to actuate an electric generator, and it is characterised in that said central body of the rotor is attached on its bottom end, in an operating situation, to a plate that is movably—that is, releasably—fastened to a crown with inner gearing of a step-up assembly of planetary gears, with an output torque transmission member that is coupled to a shaft or rotating member of the electric generator.

According to a preferred embodiment, said crown with inner gearing is attached on its top and bottom to the plate and to the electric generator, in both cases being attached to peripheral areas of said plate and the casing and bounding a transmission box. The geared crown transmits the rotation of the rotor to planetary gears mounted on a fixed planet-carrier disk, and said planetary gears transmit the rotation to a central gear that receives the stepped-up rotation relative to the speed of rotation of the blades, said central gear communicating torque directly to the generator, which converts the rotational force generated by the wind into electric energy.

Other characteristics of the wind turbine being proposed will become apparent from a detailed reading of an embodiment, given by way of illustration and not limitation, with reference to the enclosed drawings.

BRIEF DESCRIPTION OF THE DRAWINGS

Lastly.

DETAILED DESCRIPTION OF AN EMBODIMENT

Figure 1:
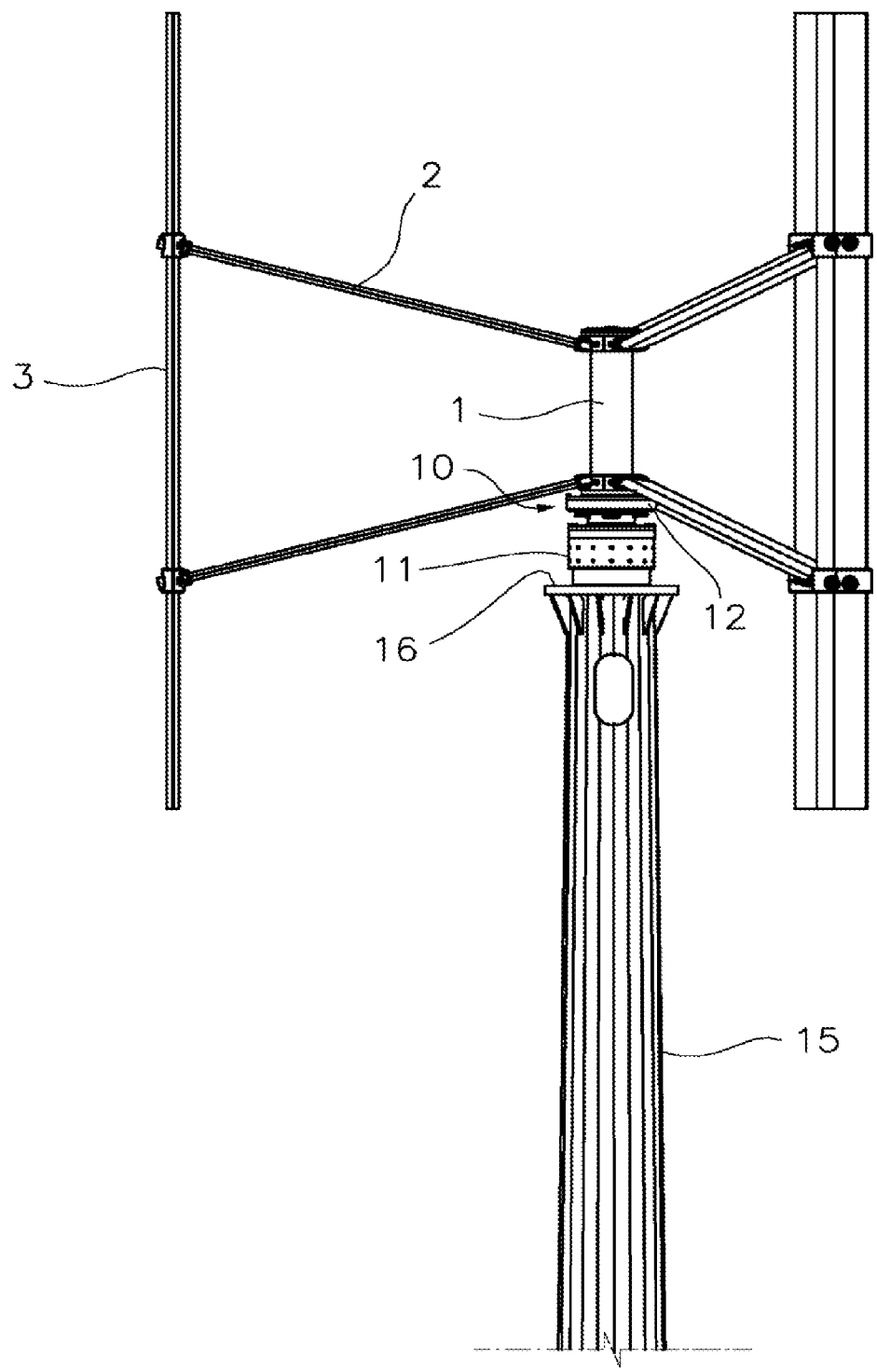
FIG. 1 is an elevation view of a wind turbine built according to the proposal of this invention.

In FIG. 1, a vertical axis wind turbine is shown that comprises a vertical column or mast 15, on whose top a platform 16 is defined wherein an electric generator 11 is coupled, associated to a transmission box 12, which is connected to a rotor linked through radial arms 2 to vertical blades 3.

The rotor 1 of the wind turbine is arranged to rotate relative to a vertical axis and it comprises a central body bearing a plurality of blades 3 concentrically and equidistantly connected to said central body through radial arms 2, said rotor 1 being operatively connected to move an electric generator 11, according to a traditional structure in this type of vertical axis wind turbines.

According to the proposal of this invention, the central body of the rotor 1 is attached on its bottom end, in an operating situation, to a plate 4 that is releasably fastened to a crown 5 with inner gearing of a step-up assembly 10 of planetary gears provided with an output torque transmission member that is coupled to a shaft or rotating member of said electric generator 11.

As shown in FIG. 1, the blades 3 of the wind turbine are vertical and parallel to the central body of the rotor 1.

Figure 2:
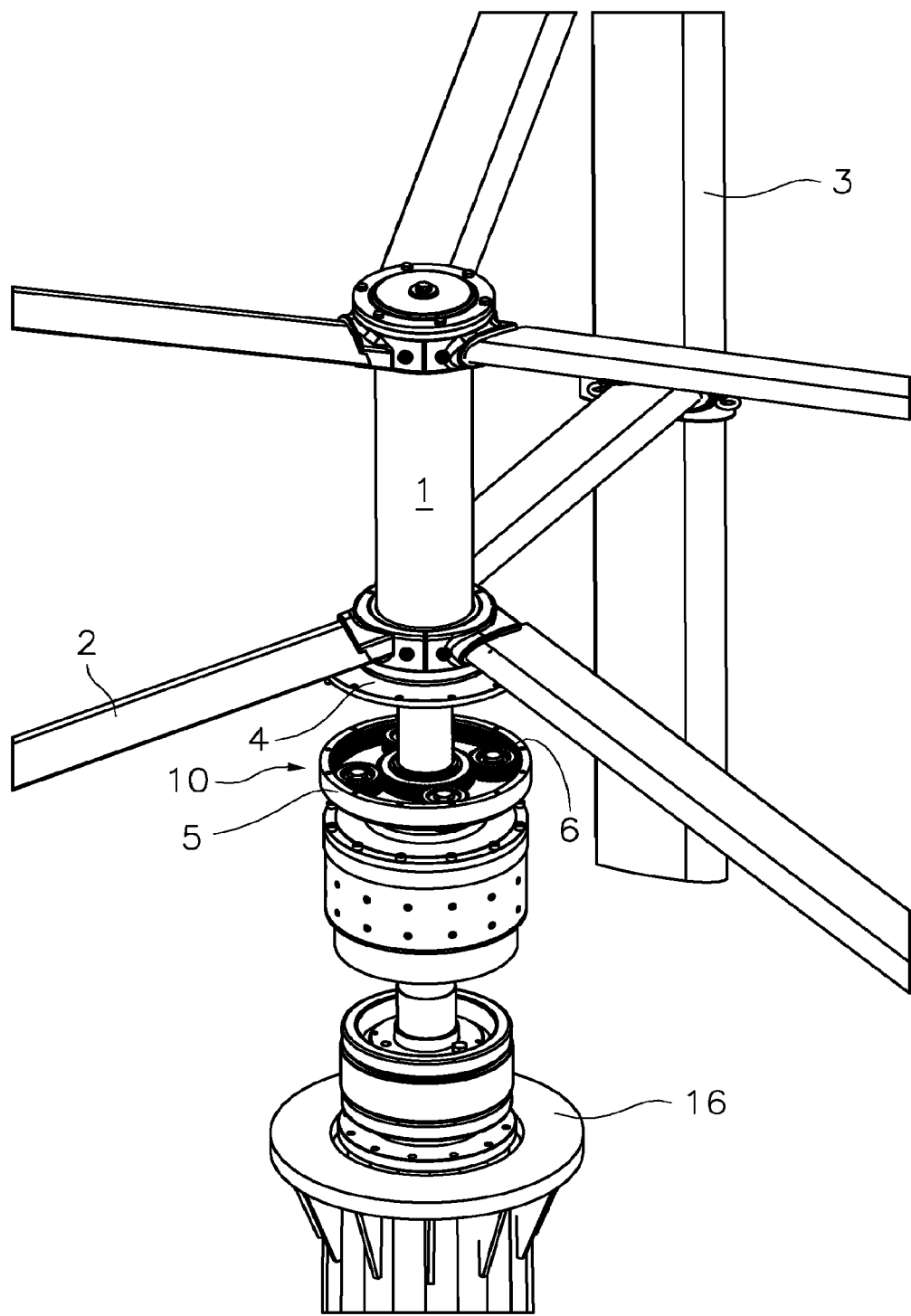
FIG. 2 is an exploded view of the area of the wind turbine integrating the transmission box and the generator.
Figure 3:
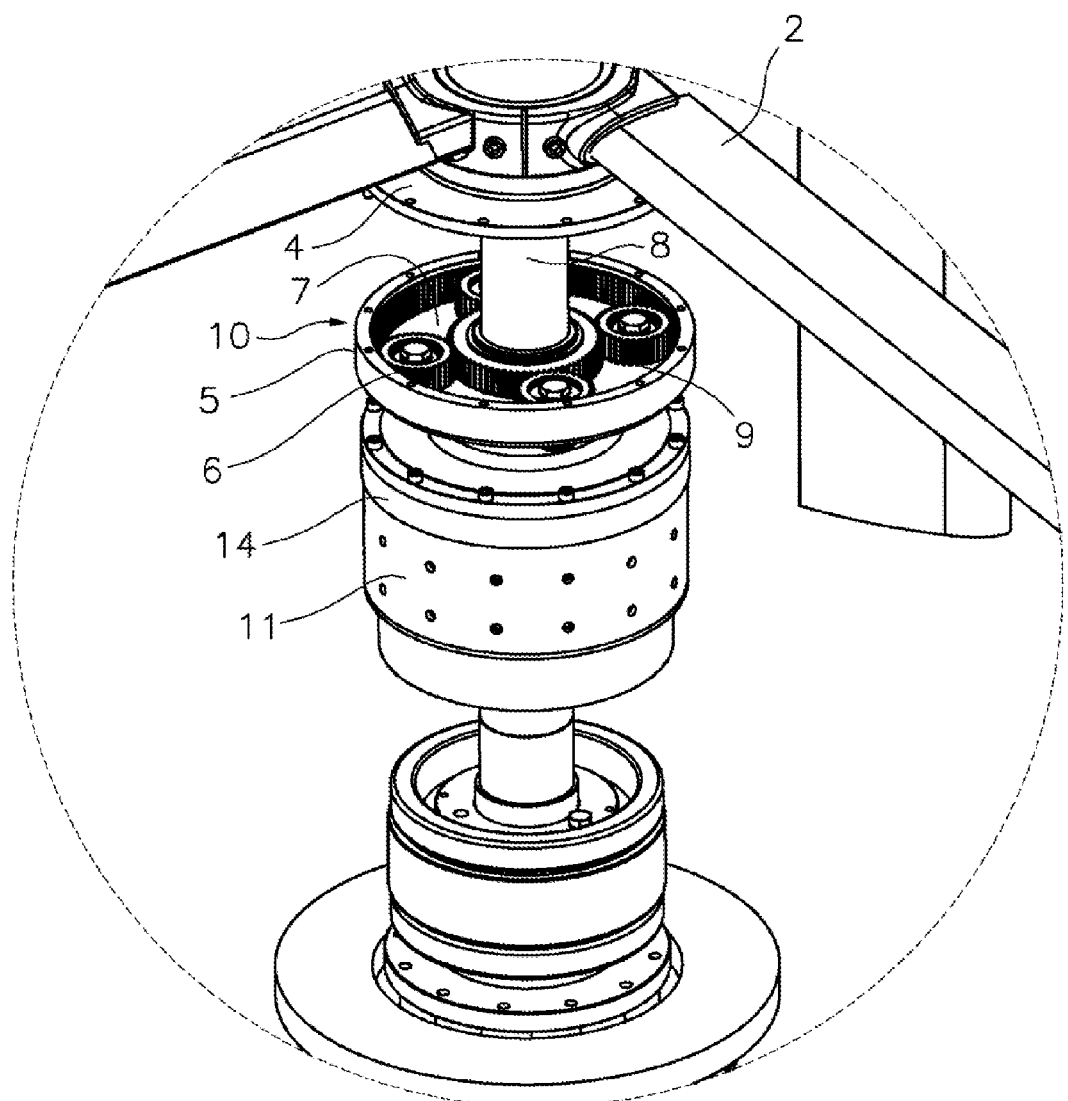
FIG. 3 is an enlarged view of the transmission box, for a better understanding of the aspects of the proposal.

As can be seen in FIGS. 2 and 3, the crown 5 with inner gearing is attached on its top to the plate 4 and said crown 5 transmits the rotation of the rotor 1 to planetary gears 6 mounted on a fixed planetary-carrier disk 7. The planetary gears 6, in turn, transmit the rotation to a central gear 9 that receives the stepped-up rotation relative to the speed of rotation of the blades 3, said central gear 9 communicating torque directly to the generator 11, which converts the rotational force generated by the wind into electric energy. This way, the transmission box 12 is bounded by said crown 5, the plate 4 attached to the bottom end of the rotor 1, and a bottom crown 14 mounted rotatably relative to a fixed casing housing the electric generator 11.

As can be noticed in FIG. 3, the central gear 9 is arranged coaxially to a central shaft 8 of the wind turbine extending from the plate 4 to inside the transmission box 12, a coaxial bearing having been provided on which said central gear 9 is coupled.

According to this invention, the proposal is advanced of using several sets of planetary gears 6 and central gear 9, capable of being arranged in a transmission box 12 in order to provide different step-up ratios depending on the conditions of the wind turbine installation (wind regime).

What is claimed is:

1. A vertical axis wind turbine, comprising a rotor (1) arranged to rotate relative to a vertical axis integrated by a central body bearing a plurality of blades (3) concentrically and equidistantly connected to said central body through radial arms (2), said rotor (1) being operatively connected to move an electric generator (11), characterized in that said central body of the rotor (1) is attached on its bottom end, in an operating situation, to a plate (4) that is releasably fastened to a crown (5) with inner gearing of a step-up assembly (10) of planetary gears, with an output torque transmission member that is coupled to a shaft or rotating member of said electric generator (11).

2. The vertical axis wind turbine according to claim 1, characterized in that said crown (5) with inner gearing is attached on its top to the plate (4) and said crown (5) transmits the rotation of the rotor (1) to planetary gears (6) mounted on a fixed planetary-carrier disk (7), and said planetary gears (6) transmit the rotation to a central gear (9) that receives the stepped-up rotation relative to the speed of rotation of the blades (3), said central gear (9) communicating torque directly to the generator (11), which converts the rotational force generated by the wind into electric energy.

3. The vertical axis wind turbine according to claim 1, characterized by comprising several sets of planetary gears (6) and central gear (9), capable of being arranged in a transmission box (12) in order to provide different step-up ratios.

4. The vertical axis wind turbine according to claim 1, characterized in that said transmission box (12) is bounded by said crown (5), the plate (4) attached to the bottom end of the rotor (1), and a bottom crown (14) mounted rotatably relative to a fixed casing housing the electric generator (11).

5. The vertical axis wind turbine according to claim 1, characterized in that said central gear (9) is arranged coaxially to a central shaft (8) of the wind turbine extending from the plate (4) to inside said transmission box (12) and has a coaxial bearing on which said central gear (9) is coupled.

6. The vertical axis wind turbine according to claim 1, characterized in that said blades (3) are vertical and parallel to the central body of the rotor (1).

\* \* \* \* \*